US010832496B2

(12) United States Patent
Kosubek et al.

(10) Patent No.: US 10,832,496 B2
(45) Date of Patent: Nov. 10, 2020

(54) SYSTEM AND METHOD FOR DETECTING RADOME DAMAGE

(71) Applicant: Airbus Operations GmbH, Hamburg (DE)

(72) Inventors: Jens Kosubek, Hamburg (DE); Christian Schaupmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 487 days.

(21) Appl. No.: 15/783,211

(22) Filed: Oct. 13, 2017

(65) Prior Publication Data

US 2018/0108187 A1  Apr. 19, 2018

(30) Foreign Application Priority Data

Oct. 13, 2016 (DE) .................. 10 2016 219 931

(51) Int. Cl.

| G07C 5/00 | (2006.01) |
|---|---|
| G01N 21/88 | (2006.01) |
| G01N 29/04 | (2006.01) |
| H01Q 1/42 | (2006.01) |
| G01N 29/44 | (2006.01) |
| G07C 5/08 | (2006.01) |
| G01N 29/14 | (2006.01) |
| G01N 29/32 | (2006.01) |

(52) U.S. Cl.
CPC ............ *G07C 5/006* (2013.01); *G01N 21/88* (2013.01); *G01N 29/045* (2013.01); *G01N 29/14* (2013.01); *G01N 29/4436* (2013.01); *G07C 5/085* (2013.01); *H01Q 1/42* (2013.01); *G01N 29/32* (2013.01); *G01N 2291/0258* (2013.01)

(58) Field of Classification Search
CPC ........ G07C 5/006; G07C 5/085; G01N 21/88; G01N 29/045; G01N 29/14; G01N 29/4436; G01N 29/32; G01N 2291/0258; H01Q 1/42
See application file for complete search history.

(56) References Cited

U.S. PATENT DOCUMENTS

| 6,686,872 B2 | 2/2004 | Vacanti |  |
|---|---|---|---|
| 2011/0112775 A1* | 5/2011 | Bramban | G01B 17/04 702/56 |
| 2013/0049769 A1 | 2/2013 | Grimm et al. | |

OTHER PUBLICATIONS

German Search Report, dated May 11, 2017, priority document.

* cited by examiner

*Primary Examiner* — Anne Marie Antonucci
(74) *Attorney, Agent, or Firm* — Greer, Burns & Crain, Ltd.

(57) ABSTRACT

A system for detecting radome damage. The system comprises a sensor unit and a processing unit. The sensor unit is configured to continuously register external impacts on a radome. The processing unit is electrically connected to the sensor unit. The processing unit is configured to compare the external impacts registered by the sensor unit with reference data. The processing unit is further formed to determine, based on the comparison, whether damage to the radome has occurred due to one or more events associated with the external impacts. Furthermore, a radome comprising the system, a flying object and a corresponding method are provided.

10 Claims, 10 Drawing Sheets

Envelope curve selection from an n-dimensional database, here n=3, example, can naturally also be produced by algorithm.

SYSTEM AND METHOD FOR DETECTING RADOME DAMAGE

CROSS-REFERENCES TO RELATED APPLICATIONS

This application claims the benefit of the German patent application No. 10 2016 219 931.5 filed on Oct. 13, 2016, the entire disclosures of which are incorporated herein by way of reference.

TECHNICAL FIELD

A system and a method for detecting radome damage are disclosed here. This system and method are based in particular on a sensor system for detecting mechanical changes to a radome, which system permits a detection of damage to the radome.

BACKGROUND OF THE INVENTION

Aircraft are usually equipped with antenna systems, which have a radome protecting against environmental influences. This radome is sometimes affected by harmful environmental impacts. These environmental impacts can be caused, for example, by birds, ice, lightning, hail or drones. Personnel are deployed to scan the radome regularly for major damage. Minor damage such as that caused by delamination, for example, can remain undetected in this process.

SUMMARY OF THE INVENTION

An object of the present invention is to improve the servicing of an antenna system and to reduce or avoid regular monitoring by personnel.

According to a first aspect, a system is provided for detecting radome damage. The system comprises a sensor unit and a processing unit. The sensor unit can be arranged, protected from an environment, in a radome and/or under the radome. The sensor unit is configured to continuously register external impacts on a radome. The processing unit is electrically connected to the sensor unit. The processing unit is configured to compare the external impacts registered by the sensor unit with reference data. The processing unit is further configured to determine, based on the comparison, whether damage to the radome has occurred due to one or more events associated with the external impacts.

This has the advantage that a functional capability of an antenna system located inside the radome can be ensured in the long term. Mechanical damage to the radome can spread. Before the antenna system is damaged by external impacts, a responsible worker can take care of any damage to the radome. It is therefore important that damage to the radome is detected early and then repaired.

This further has the advantage that even with a small radome structure, the sensor unit and the processing unit have space inside the radome and weight can be saved.

Furthermore, the processing unit can be configured to distinguish, based on the comparison, various events associated with the impacts, for example weather, noise, minor/major radome impacts or permanent radome structural damage.

The processing unit can further be configured to classify the one or more events associated with the external impacts based on the determination. A signal can be triggered by the classification, for example, or a message can be forwarded to a communications unit outside the radome. The communications unit can be, e.g., a receiver of a ground station, for example. A transmitting unit can be configured to trigger the signal or transmit the message to a receiver outside the radome. The processing unit can comprise the transmitting unit, or the transmitting unit can be connected communicatively to the processing unit.

This has the advantage that personnel can be requested quickly and reliably to rectify the damage.

The radome can be attachable or attached to a flying object and/or the fuselage of the flying object. The flying object can be a drone or an aircraft, for example.

The reference data can comprise a basis of expected data. The reference data can be updated regularly during a flight operation of the flying object. The reference data can be determined by parameters such as roll angle, pitch angle, yaw angle, altitude or speed of the flying object or air speed. Furthermore, the parameters can be selected from a database and/or calculated. The reference data can reproduce environmental noise in relation to the radome with reference to the supplemented/determined data.

This has the advantage of determining possible defects on the radome during operation of the radome without influencing the functionality or disrupting the flight operation.

The sensor unit can be an acoustic sensor. The acoustic sensor, for example a microphone, can be configured to register audio signals continuously. The acoustic sensor can be configured to operate in a frequency range by registering vibrations of the radome as a consequence of mechanical impacts. The vibration characteristics of the radome can be determined by the dimensions of the radome. In this case the position of the acoustic sensor inside the radome can be set to be adapted for corresponding acoustic modes. The processing unit can be configured to compare the continuously registered audio signals with the reference data.

The sensor unit can further be an optical sensor. The optical sensor can be configured to record continuously a distance to a part of the radome. The processing unit can further be configured to determine mechanical deformations and/or movements of the radome based on changes in the distance. Furthermore, the processing unit can be configured to compare the mechanical deformations and/or movements with the reference data. The processing unit can be configured to trigger a signal if the mechanical deformations and/or movements differ from the reference data by a predetermined condition, e.g., exceeding or falling below one or more values of an envelope curve of threshold values.

The sensor unit can further be a brightness sensor. The brightness sensor can be configured to register mechanical deformations and/or movements of the radome based on changes in light intensity.

A brightness sensor has the advantage of detecting an impact and at the same time of being of a comparatively simple construction and convenient to procure. At night, the bright flash of position lights and, during the day, sunlight can be detected through a crack.

According to a second aspect, a radome comprises a system according to the first aspect. The system or parts of the system, for example the sensor unit and/or processing unit, can be arranged in the radome.

The radome can form a part of a Ku-band and/or Ka-band antenna system. The radome can further be configured for use in the Ku-band and/or Ka-band. The processing unit according to the first aspect can be configured accordingly to determine damage to the radome.

The radome can be attachable or attached to a flying object and/or to the fuselage of the flying object.

According to a third aspect, a flying object comprises a radome according to the second aspect. The flying object can be a drone or an aircraft, for example.

According to a fourth aspect, a method is provided for detecting radome damage. The method comprises continuous registering of external impacts on the radome by a sensor unit. The sensor unit can be arranged protected from the environment in a radome, for example. The method further comprises comparing the external impacts registered by the sensor unit with reference data by a processing unit connected electrically to the sensor unit. The method further comprises determination, based on the comparison, of whether damage has occurred to the radome due to one or more events associated with the external impacts. The determination can take place in the processing unit.

Whether damage has occurred to the radome can further be established by a predetermined condition. The condition can be exceeding and/or falling below an envelope curve by one or more values. The envelope curve can refer to the reference data or be determined from this. Furthermore, the condition can be a repeated occurrence of an exceeding and/or falling below the envelope curve by a group of values. The predetermined condition can further be determined by an expected value. The reference data can correspond to expected values. The expected values can be calculated from measurements/data provided by the environment. The expected values can be stored in the reference database. When comparing the mechanical deformations and/or movements with the reference data, a divergence of the mechanical deformations and/or movements from the expected values can be determined. Based on the divergence, a signal can further be triggered, with which it is signaled that damage has occurred. This signal can be transmitted to a service responsible for the radome.

The reference data can further be provided by a reference database. The reference database can be contained in the processing unit or be connected to the processing unit by a communications interface.

Furthermore, the step of comparing can be carried out by a comparator contained in the processing unit. The step of determination can further be carried out by an evaluation unit contained in the processing unit.

The method can further comprise a classification of the one or more events associated with the external impacts based on the determination. The classification can take place in the processing unit and/or serve to trigger a signal or to forward a message to a communications unit outside the radome. The communications unit can be, e.g., a receiver of a ground station, for example.

Furthermore, the step of classification can be carried out in the evaluation unit. The step of triggering a signal can further be carried out by a transmitting unit fitted in or on the processing unit or connected to it. The transmitting unit can be configured in this case to transmit messages/signals to a communications server or a base station. The communications server or the base station can further transmit a message to personnel supporting the maintenance of the radome in order to inform them of possible radome damage.

The classification has the advantage that the nature of the damage can be estimated and a statement can be made about a degree of urgency.

The signal or the message can further indicate a necessity of servicing.

This has the advantage that the personnel do not have to be called for every classification, but an assessment of the urgency can be carried out.

The method can further comprise provision of flight data such as altitude, position and/or speed. Furthermore, the method can comprise provision of the reference data. The reference data can be provided prior to the comparison based on the flight data provided.

The reference data can be expected values and/or envelope curves calculated from these. Damage can be detected if the external impacts registered are greater in amount in the step of comparison than at least one of the envelope curves.

The method can further comprise establishing whether at least one envelope curve of the reference data for a certain period has too large or too small reserves in regard to the external impacts registered. The method can further comprise self-calibration, based on the establishment, of the reference data.

The individual steps of the method can each be carried out by different units. It is conceivable that the processing unit comprises several units, wherein each unit can carry out one or more steps.

According to a fifth aspect, a computer program is provided for executing the method according to the third aspect.

According to a sixth aspect, a storage medium is provided for storing a computer program according to the fourth aspect.

It is clear to the person skilled in the art that the explanations set out here can be/become implemented using hardware circuits, software means or a combination of these. The software means can be associated with programmed microprocessors or a general computer, an ASIC (Application Specific Integrated Circuit) and/or DSPs (Digital Signal Processors). For example, the processing unit can be realized partially as a computer or a processor (for example, a microprocessor, microcontroller or DSP). It is also clear to the person skilled in the art that even if the details described herein are described in regard to a method, these details can also be realized in a suitable device unit, a computer processor or a memory connected to a processor, wherein the memory is provided with one or more programs, which carry out the method when they are executed by the processor.

Even if some of the aspects described above were described in regard to the method, these aspects can also apply to the system. In just the same way the aspects described above in regard to the system can apply correspondingly to the method.

BRIEF DESCRIPTION OF THE DRAWINGS

Further objectives, features, advantages and application options result from the following description of exemplary embodiments, which should be understood as not being restrictive, with reference to the associated drawings. In this case all features described and/or depicted show by themselves or in any combination the object disclosed here, even independently of their grouping in the claims or their back references. The dimensions and proportions of the components shown in the figures are not necessarily to scale here; they may deviate from what is illustrated here in embodiments to be implemented.

The method variants described here and their functional and operating aspects serve only for a better understanding of their structure, mode of operation and properties; they do not restrict the disclosure to the exemplary embodiments. The figures are partly schematic, wherein substantial properties and effects are shown in part significantly enlarged in order to clarify the functions, active principles, technical configurations and features. In this case every mode of operation, every principle, every technical configuration and every feature, which is/are disclosed in the figures or in the text, can be combined freely and in any manner with all claims, every feature in the text and in the other figures, other modes of operation, principles, technical configurations and features, which are contained in this disclosure or arise from it, so that all conceivable combinations are to be associated with the devices described. Combinations between all individual statements in the text, meaning in each section of the description, in the claims and also combinations between different variants in the text, in the claims, and in the figures, are also comprised and can be made the subject of further claims. The claims do not limit the disclosure and thus the combination options of all features shown with one another either. All disclosed features are disclosed explicitly here also individually and in combination with all other features.

DETAILED DESCRIPTION OF THE PREFERRED EMBODIMENTS

In the figures, components corresponding to one another or similar in function are provided with the same reference signs. The method according to the invention and the system according to the invention are now described with reference to exemplary embodiments.

In the following, without being restricted to these, specific details are explained to supply a complete understanding of the present disclosure. However, it is clear to a person skilled in the art that the present disclosure can be used in other exemplary embodiments, which can deviate from the details explained below.

Figure 1:
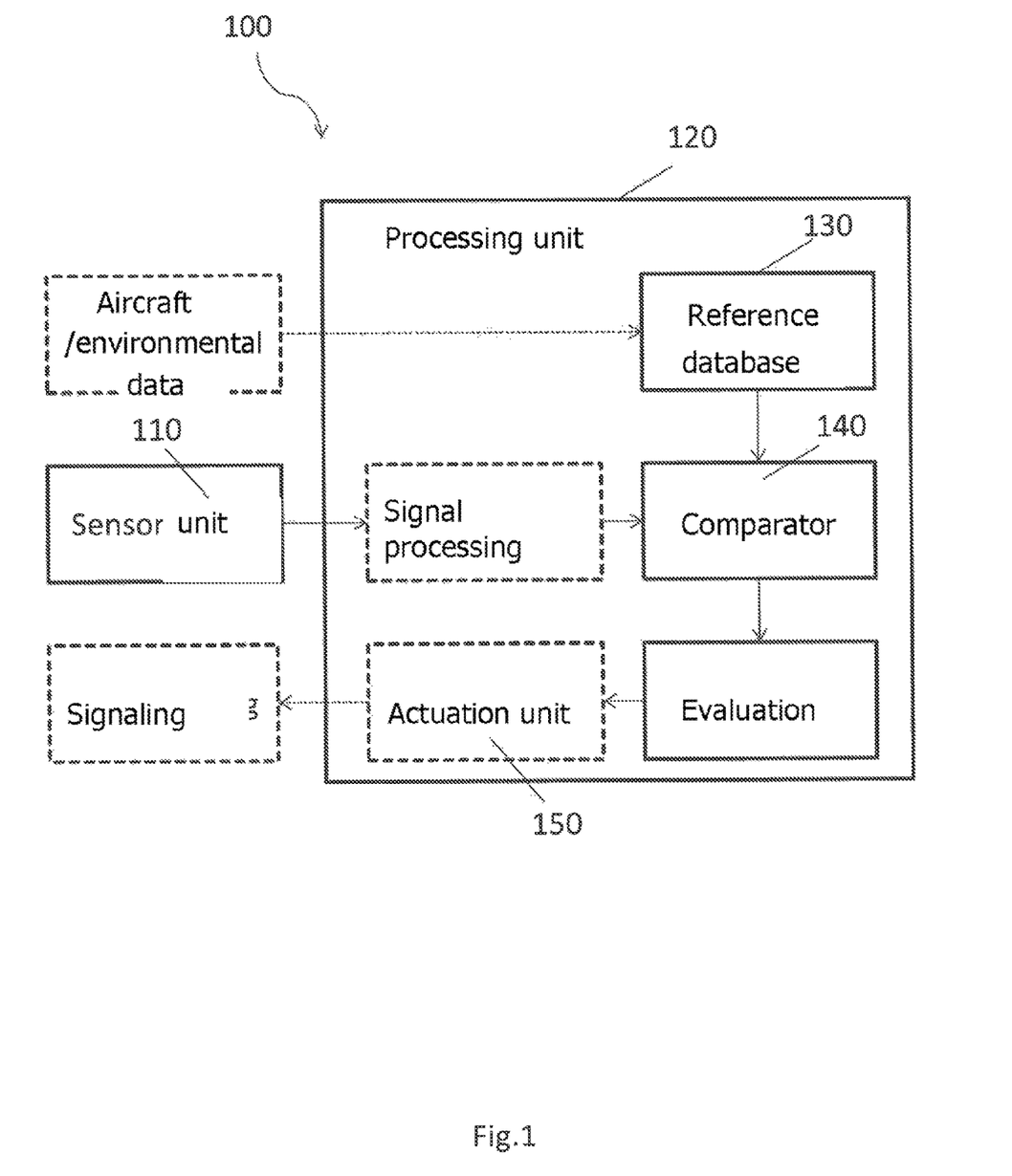
FIG. 1 shows schematically an exemplary embodiment of a system for detecting radome damage.

FIG. 1 shows schematically an exemplary embodiment of a system 100 for detecting radome damage. The system 100 can comprise a sensor unit 110, a processing unit 120, a reference database 130, a comparator 140 and an actuation unit 150. The processing unit processes aircraft and/or environmental data, with reference to which the vibrations to be expected can be selected from reference data. From these an envelope curve can be calculated with which the external impacts can be compared. The reference database 130 can provide data about measured values to be expected with reference to environmental data such as speed, yaw rate, roll rate, pitch rate and/or air resistance. The reference database 130 can be formed as a normal memory. The reference database can be contained in the processing unit or be part of the processing unit 120. The sensor unit 110 can detect/register changes in a wall of a radome. The sensor unit 110 can be an optical, acoustic or brightness sensor. The changes registered by the respective sensor can then be processed in the processing unit 120 (see signal processing block) and provided to the comparator 140. The system 100 can consist exclusively of sensor unit 110 and processing unit 120. This means that the entire signal processing can be carried out by the processing unit 120. The signals and information supplied to the comparator 140 by the sensor unit 110 on the one hand, and the reference database 130 on the other hand, can be compared in the comparator 140 and evaluated in the evaluation block, in which, via a comparison between reference data from the reference database 130 and the signals (or information), registered by the sensor unit 110 or also preprocessed signals (or information) a condition is introduced. If this condition is fulfilled, the actuation unit 150 can forward a signal (see signaling block) to a base station or to another information server to signal whether damage has occurred to the radome.

Figure 2:
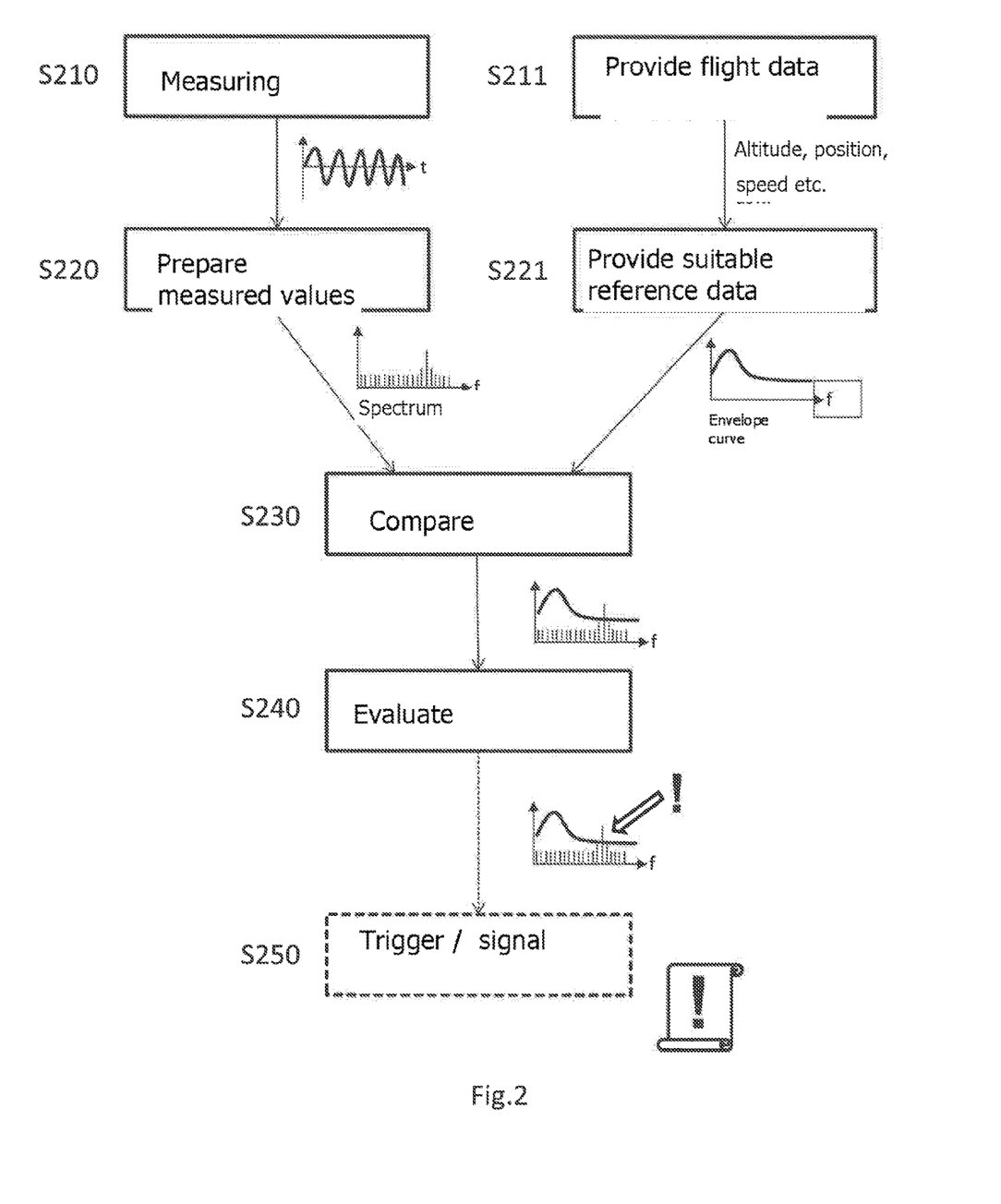
FIG. 2 shows schematically an exemplary embodiment of a method for detecting radome damage.

FIG. 2 shows schematically an exemplary embodiment of a method for detecting radome damage. The method comprises the step of continuous registering S210, by a sensor unit, which is arranged protected from the environment in a radome, for example, against external impacts on the radome. The step of registering S210 can comprise the step of measuring S210. The method can further comprise the step of measured value preparation S220. The step of measured value preparation S220 can comprise a frequency selection. This frequency selection can be limited to the audible frequency spectrum, for example. The preparation of the measured values S220, here the registered external impacts on the radome, can be a frequency spectrum in the simplest case. It is also conceivable that only a partial range of measured values, for example characteristic partial ranges of the, for example, audible, frequency range can be selected. A parameter would be conceivable, for example, for the frequency scope or the constancy of the measured values or a standardized spectrum to blank out the influence, for example, of the volume. Expected values determined from the measured values can be stored in the reference database. The reference database can further provide the reference data to a comparator or a processing unit from FIG. 1. It is also conceivable that the reference database can be retrieved and the reference data provided thereby. This reference data can be provided in the form of an envelope curve. The method further comprises the step of comparing S230, by a processing unit, which is connected electrically to the sensor unit, the external impacts registered by the sensor unit with reference data. For the comparing step S230 the method can comprise two additional steps, the step of providing flight data S211 and the step of providing reference data S221. The step of providing flight data S211 can be a provision of aircraft parameters during flight operation, such as an altitude, position, speed of the aircraft, for example. The aircraft is described here as an example of a flying object. The (appropriate) reference data can then be provided in step S221 so that the measured values from step S220 can be compared with it. The comparing S230 thus represents an opportunity to determine an impact or other influences on the radome. The method further comprises the step of determining S240, based on the comparison, by the processing unit 120, whether damage has occurred to the radome due to one or more events associated with the external impacts. The method can further comprise the step of classifying or evaluating S240, by the processing unit, the one or more events associated with the external impacts, based on the determination. The method can further comprise the step of triggering S250 a signal or of forwarding S250 a message to a communications unit outside the radome, for example to a ground station. The signal or the message can further indicate a necessity for servicing. The method can be used, for example, for an antenna system protected by a radome, as shown in FIG. 5.

Figure 3:
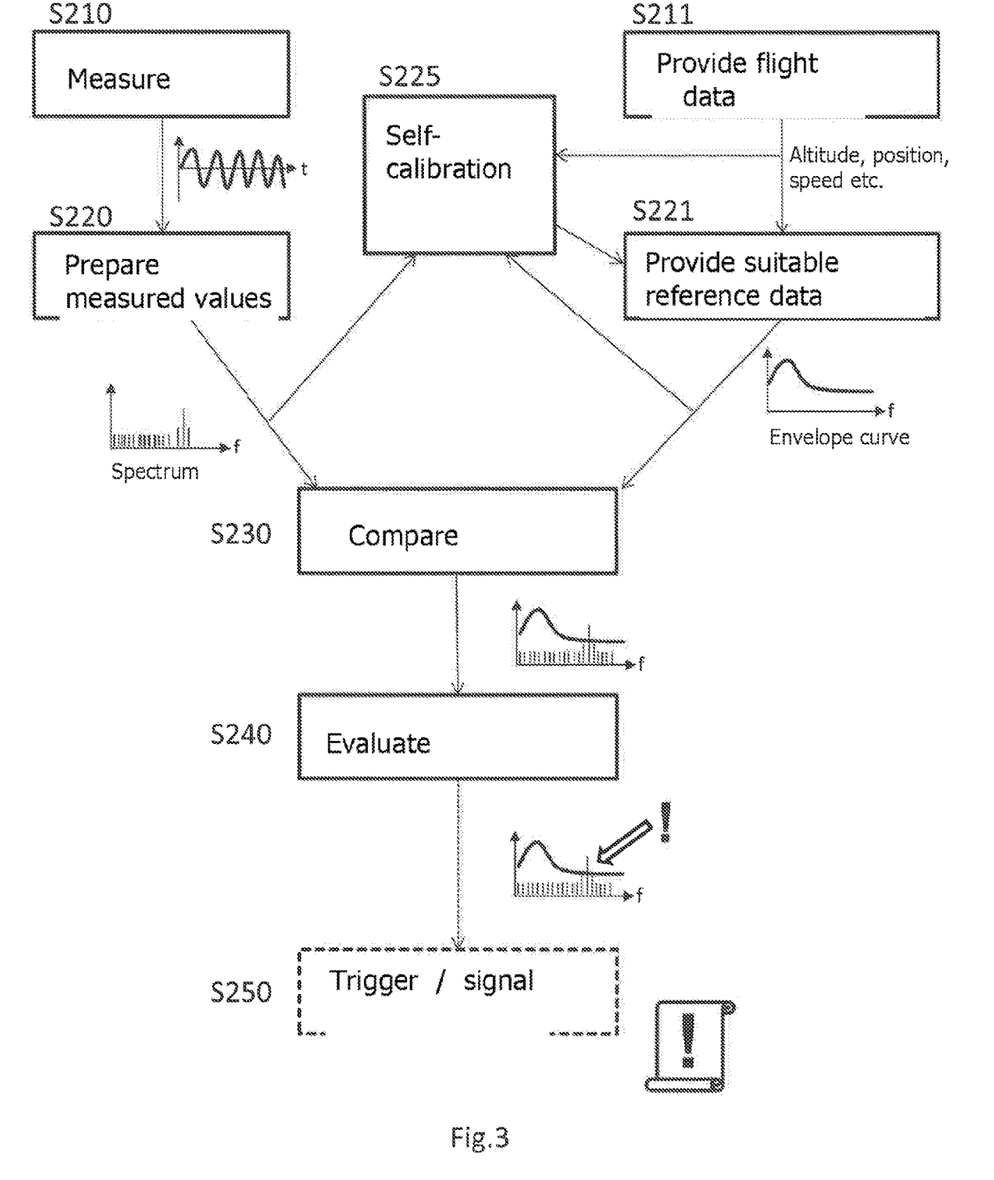
FIG. 3 shows schematically an exemplary embodiment of a method for detecting radome damage.

FIG. 3 shows schematically an exemplary embodiment of a method for detecting radome damage according to the FIG. 2, expanded by the step of self-calibration S225. In the step of self-calibration S225, it can be established whether an envelope curve as in FIG. 2, for example, supplies, in the long term or permanently, too large or too small reserves in relation to the measured values. In the step of self-calibration S225, an algorithm can accordingly adapt the reference data, here the expected values, based on the reserve. By this the system from FIG. 1 can contain a learning process, for example, due to the method cited here. This leads to increasingly accurate results in the detection of damage to the radome.

Figure 4:
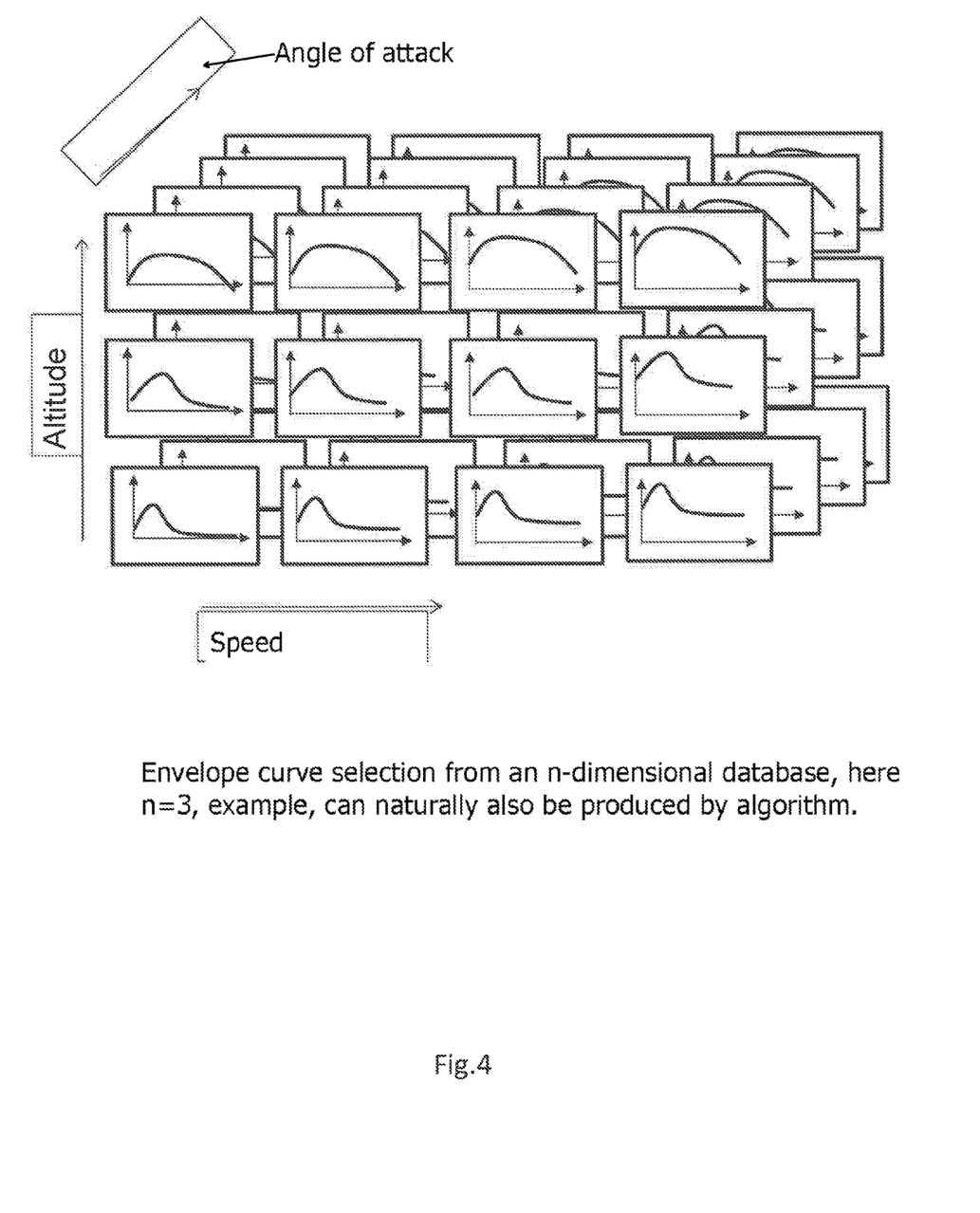
FIG. 4 shows schematically envelope curves for 3 parameters of a reference database, speed, altitude and angle of attack.

FIG. 4 shows schematically envelope curves for 3 parameters of a reference database, speed, altitude and angle of attack. These envelope curves can form the reference data that is compared in step S230 in FIG. 2 and FIG. 3 with the measured values or with the registered external impacts. The envelope curves can be selected from an n-dimensional database, the reference database, here n=3 by way of example. These envelope curves are then used in step S230 and step S240 for comparing or for evaluating whether damage has occurred to the radome. It is also conceivable that the reference data is selected via an algorithm or is provided by an algorithm. In addition, it is possible that the reference data contains the envelope curves or the envelope curves are preselected from the reference data.

Figure 5:
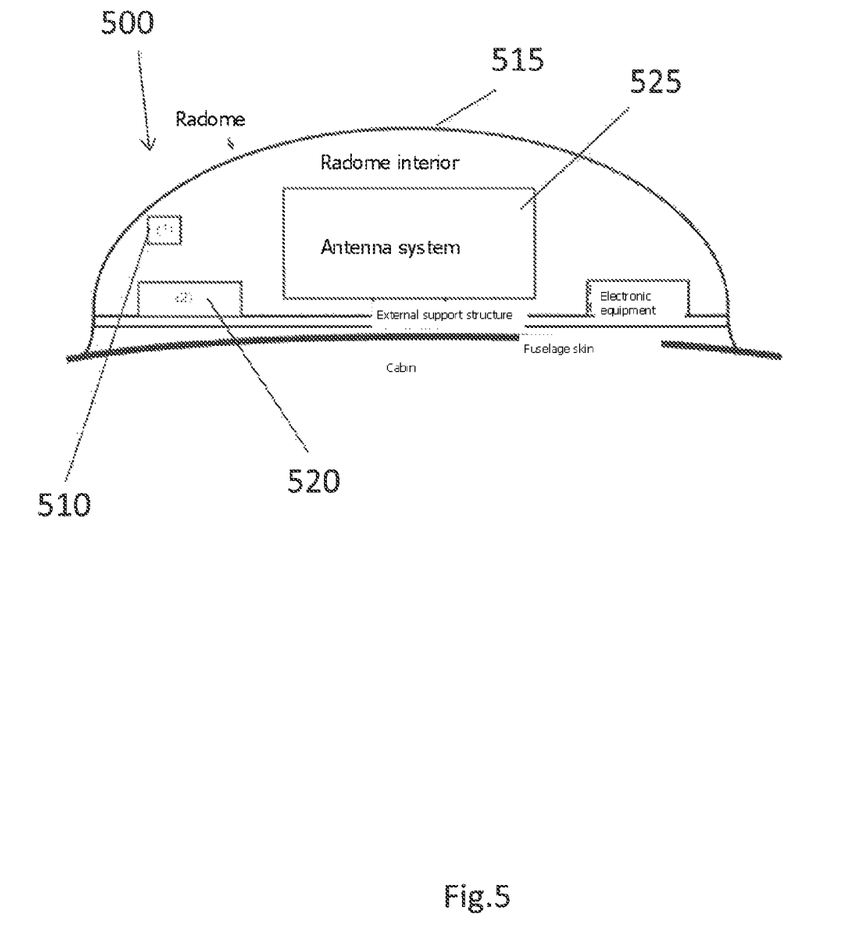
FIG. 5 shows schematically an exemplary embodiment of an arrangement of antenna system and a system for detecting radome damage.
Figure 6:
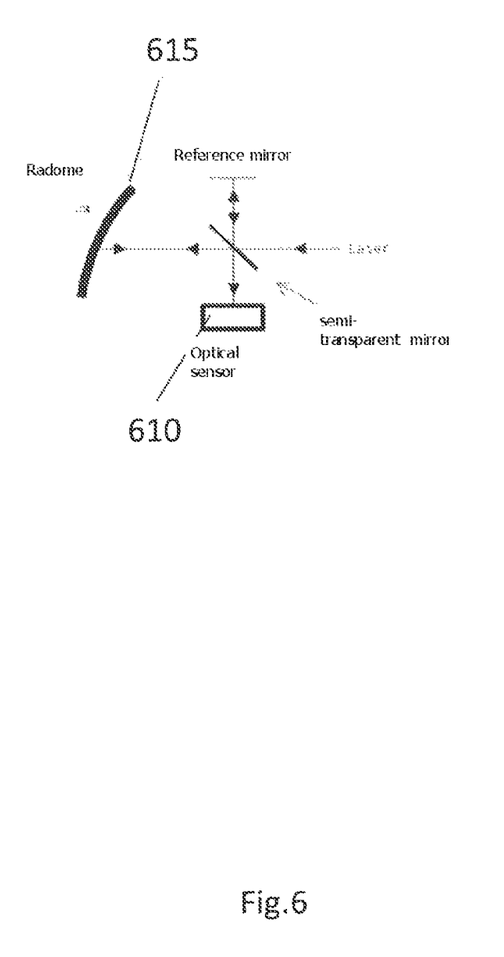
FIG. 6 shows schematically an exemplary embodiment of a use of an optical sensor for detecting radome damage.

FIG. 5 shows schematically an exemplary embodiment of an arrangement of antenna system and a system for detecting radome damage. An arrangement of radome 515, antenna system 525, the system 500 comprising a sensor unit 110 and a processing unit 120 corresponding to FIG. 1 is shown in FIG. 5. Furthermore, a fuselage skin and a cabin are indicated in FIG. 5. To protect the antenna system, which can also consist of a single antenna, from external influences, it can be constructed inside a radome. To now determine whether damage has occurred to the radome, the system 500 with the components 510 and 120 can be used to determine continuously whether damage has occurred to the radome, even during flight operation. This can save on comparatively expensive equipment, which could be damaged in the event of serious environmental influences, due to which the entire antenna system 525 would possibly have to be exchanged. The sensor unit 510 can be formed, for example, as shown in FIG. 6, as an optical sensor. An acoustic sensor or a brightness sensor would also be conceivable.

FIG. 6 shows schematically an exemplary embodiment of a use of an optical sensor 610 for detecting radome damage. Here a radome 615 is shown, which serves as a reflector of an optical measuring signal, which originates from a laser source (termed a laser in FIG. 6) and is received by the optical sensor 610. As an example, a semi-transparent mirror and a reference mirror are shown here. Starting out from a laser source, which is shown to the right in FIG. 6, a laser beam can penetrate through the semi-transparent mirror in the direction of a part of the radome 615, wherein the semi-transparent mirror can be partly permeable in the direction of the laser beam, and the other part of the laser beam can be deflected in the direction of the reference mirror. Roughly 50% of the laser beam can be diverted in the direction of the radome here and roughly 50% in the direction of the reference mirror. The laser beam deflected back by the radome can be diverted in turn to 50% at the semi-transparent mirror, in this case in the direction of the optical sensor 610, whereby changes in distance can be determined. The optical sensor 610 represents the sensor unit corresponding to FIG. 1, wherein the processing of the signals received can proceed accordingly. When using an acoustic sensor, a representation is possible via a spectrogram, which can visualize the detection of possible damage to the radome.

Figure 7:
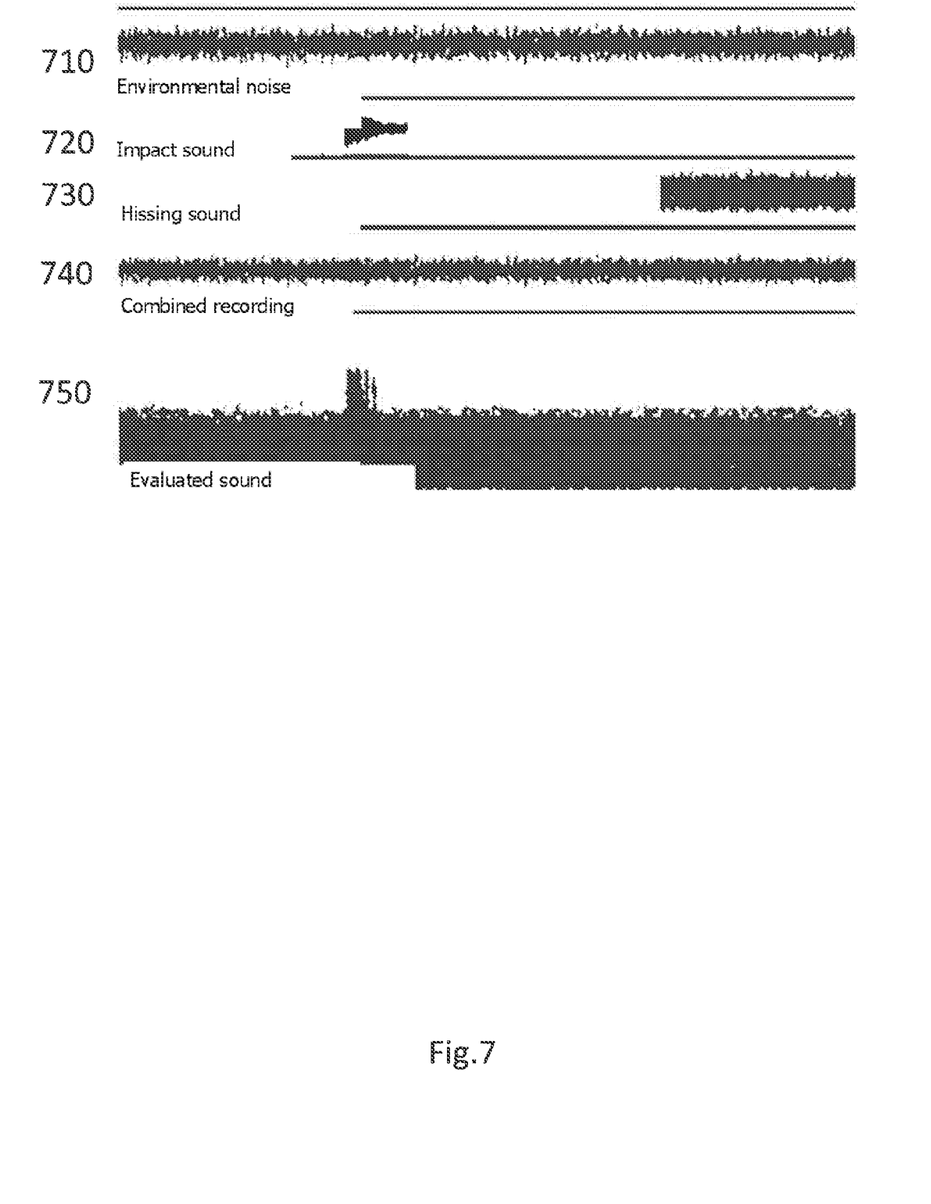
FIG. 7 shows schematically, with reference to exemplary noises, an evaluation in a spectrogram of audio signals for detecting radome damage.

FIG. 7 shows schematically, with reference to exemplary noises, an evaluation of audio signals in a spectrogram for detecting radome damage. The five curves 710 to 750 show ambient noise 710, an impact sound 720, a hissing sound 730, a combined recording of the sounds 740 and a signal progression 750 determined by the evaluation according to FIG. 2 that visualizes an external impact by the impact sound 720, whereby damage to the radome can be detected. A signal can be triggered by this by the processing unit according to FIG. 1, whereby monitoring personnel or appropriate maintenance personnel can be informed, in order to rectify the possible damage. The acoustic sensor can be positioned in the radome so that antenna dimensions and/or dimensions of the radome as well as of the sensor unit and the processing unit according to FIG. 1 can be taken into account in a positioning of the system. It can be taken into account additionally here that a corresponding mode propagation for frequency ranges to be registered can be optimized.

Furthermore, a brightness sensor can be used as a sensor unit. Sometimes the radome is not transparent and prevents light from outside from penetrating. The antenna or the antenna system is thus arranged in a dark environment. Damage to the radome, for example cracks in the radome shell that can be caused by birds, hail or the like, therefore result in a rapid and/or permanent change in the relative brightness or in the ambient light inside the radome or in the radome region observed from inside. This change in the brightness or the ambient light can be registered very easily by the brightness sensor. To do this, the brightness can be compared with an expected value of the global position and time of day. The brightness sensor can be part of the antenna system (/of the antenna) under the radome or a separate component. Radome damage can thus be detected even at night. For example, only slight light from outside compared with the darkness inside the radome can be registered. Furthermore, the additionally available light of the navigational light of a flying object on which the radome can be fitted, which light is possibly located nearby, can be registered at night.

Figure 8A:
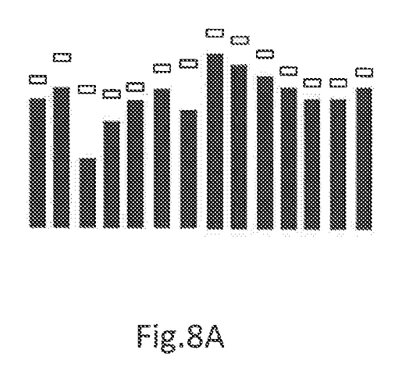
FIG. 8A shows schematically an envelope curve for detecting radome damage.
Figure 8B:
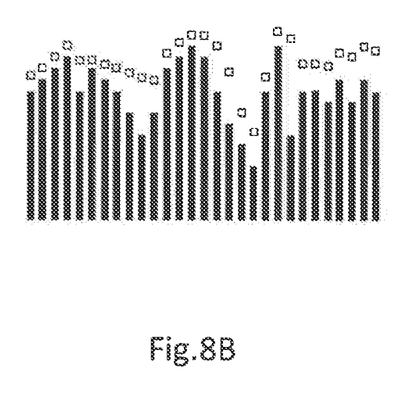
FIG. 8B shows schematically an envelope curve for detecting radome damage.

FIGS. 8A and 8B show schematically envelope curves for the detection of radome damage. These curves are used to set a condition with which damage can possibly be determined. This curve can be specified by expected values calculated from the reference data, so that possible radome damage can be determined. It can be determined due to the condition whether mechanical deformation or a change to the radome, and thus damage to the radome, has occurred with a probability bordering on certainty. Costs can be saved relatively easily by this. The main advantage is that a necessary inspection or repair of the radome can be scheduled at the destination of the aircraft. This shortens the repair time, spare parts, lifting platforms and personnel can be ready for deployment. In the best case, the operator saves on the cancellation of a following flight or the provision of a replacement aircraft.

Advantages of the exemplary embodiments described above lie in the fact that the radome reacts mechanically to audible frequencies and frequencies lying below these. The radome reacts to mechanical impacts with vibrations in the mainly audible range. The system described above can accordingly utilize these properties. Furthermore, the system, or the sensor unit, can be calibrated so that it is optimized according to the frequencies to be measured. Above all, the service life of the antenna system or of an aircraft fuselage, for example even an outer wall of a drone, is also extended. Human error can also be largely avoided by the use of the system and method described above. Furthermore, a data collection of the data acquired due to the external influences can not only be stored in the reference database, but also lead to a collection of data on an external storage device, which can then be used for further diagnoses. The implementation inside the radome is also associated with little expenditure, on account of the assemblies/components available for this, for example of standard printed circuit boards (PCBs), IRS environmental data or a communications connection.

Figure 9:
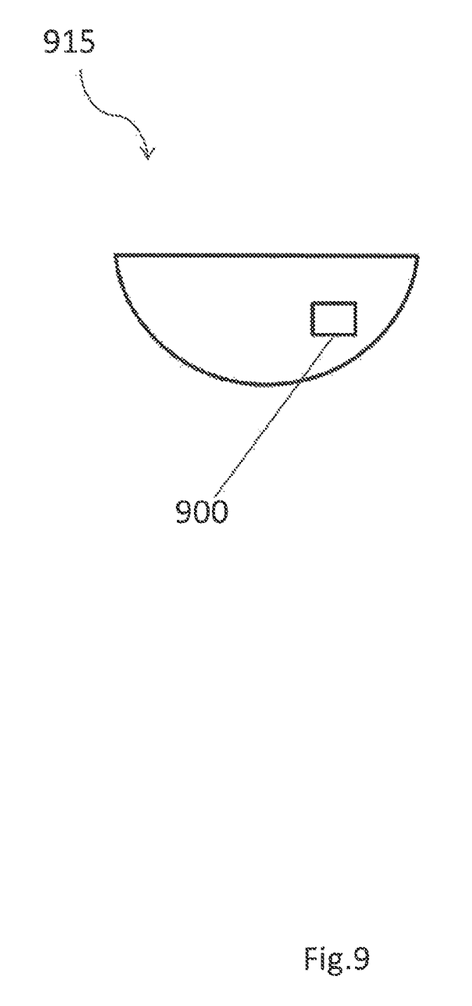
FIG. 9 shows schematically an exemplary embodiment of a radome with a system for detecting radome damage.

FIG. 9 shows schematically an exemplary embodiment of a radome 915 with a system 900 for the detection of radome damage. The radome 915 can be configured to be operated optimally for frequencies in the Ka-band and Ku-band. For this purpose, an antenna system corresponding to the Ka-band and Ku-band can be arranged in the radome. The system 900 can be used during flight operation to determine any impacts by birds, hail, lightning, etc. To this end, the system 900 is freely positionable inside the radome so that the properties of the antenna are not disturbed. The radome 915 can be fitted underneath a flying object such as a drone or a small airplane. The fitting of the radome 915 is shown in FIG. 10.

Figure 10:
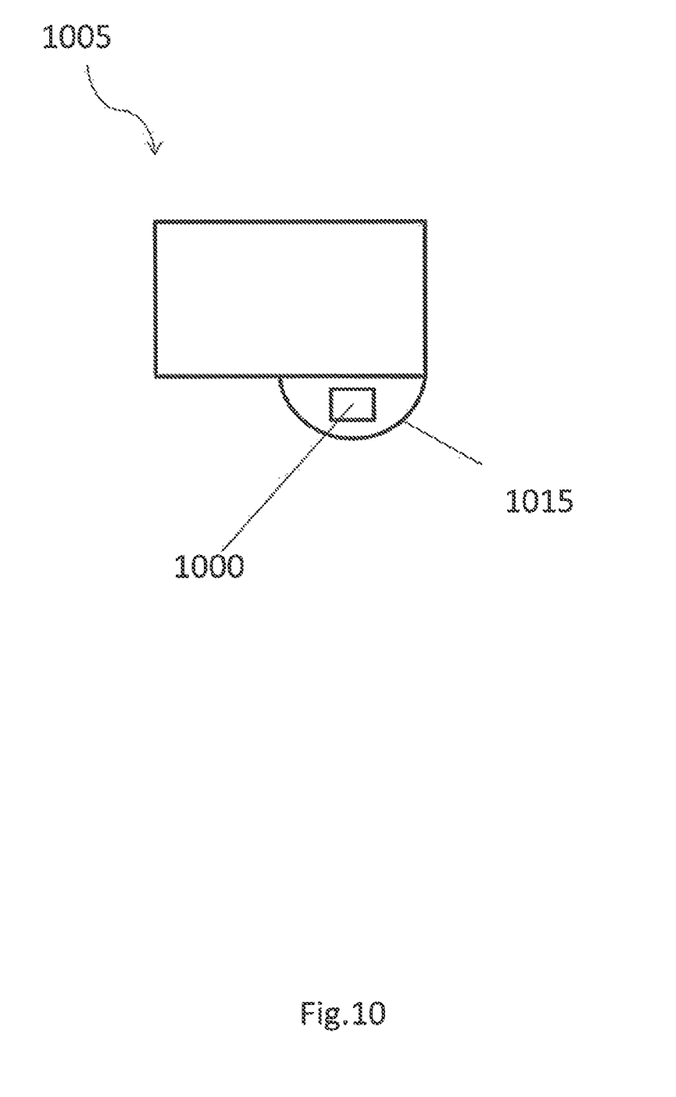
FIG. 10 shows schematically an exemplary embodiment of a flying object with a radome and a system for detecting radome damage.

FIG. 10 shows schematically an exemplary embodiment of a flying object 1005 with a radome 1015 and a system 1000 for detecting radome damage. The radome 1015, with the antenna system(s) and the system 1000 for detecting radome damage located therein, can be fitted underneath a flying object or on the tip of a drone, for example. The radome is exposed by this to impacts, in particular, by hail or by birds. In flight operation of the flying object 1005, the system or a processing unit (corresponding to FIG. 1) can be set so that the reference database is supplied with information or information/data are provided to the reference database, such as air resistance, speed of the flying object 1005, yaw rate of the flying object 1005, roll rate of the flying object 1005, pitch rate of the flying object 1005 and also environmental noise effects, or specific noise level in relation to the environment of the radome 1015. The system 1000 can not only be located in the radome 1015, but it is also possible for the system 1000 to be located in the flying object 1005. The flying object 1005 can preferably be a drone or a small airplane, thus an antenna system in the Ku-band or Ka-band can be transported with comparatively little weight. A backend of the antenna system can thus be calibratable/adjustable more easily to properties of the flying object 1005. The Ku-band or the Ka-band antenna system has the advantage that due to the small structural size a smaller flying object 1005 can be used. However, with the higher frequency in contrast to an X-band antenna, for example, the disadvantages of the path loss must be compensated for. To ensure that other disadvantageous effects do not arise due to the radome, the system 1000 is used to detect radome damage to the radome 1015.

The invention is not restricted to the embodiments described above. On the contrary, many options for modifications to these become apparent to an average person skilled in the art without departing from the basic idea of the invention as defined in the enclosed claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for detecting radome damage, the system comprising:
   a sensor unit configured to continuously record external impacts on a radome; and
   a processing unit connected electrically to the sensor unit and configured to compare the external impacts registered by the sensor unit with reference data and to determine, based on the comparison, whether damage to the radome has occurred due to one or more events associated with the external impacts,
   wherein the reference data is updated regularly during flight operation of a flying object and is determined by a parameter to provide an updated reference data, and wherein the reference data reproduce an ambient noise in relation to the radome with reference to the updated reference data, and
   wherein the parameter is selected from one or more of roll angle, pitch angle, yaw angle, altitude, air speed and ground speed of the flying object.

2. A radome comprising the system according to claim 1.

3. The radome according to claim 2, wherein the radome forms part of at least one of a Ku-band or Ka-band antenna system and is configured for use in at least one of Ku-band or Ka-band.

4. The radome according to claim 2, wherein the radome is attachable or attached to a portion of the flying object.

5. A flying object, comprising a radome wherein the radome forms part of at least one of a Ku-band or Ka-band antenna system and is configured for use in at least one of Ku-band or Ka-band, the radome comprising a system for detecting radome damage, the system comprising:
   a sensor unit configured to continuously record external impacts on the radome; and
   a processing unit connected electrically to the sensor unit and configured to compare the external impacts registered by the sensor unit with reference data and to determine, based on the comparison, whether damage to the radome has occurred due to one or more events associated with the external impacts,
   wherein the reference data is updated regularly during flight operation of the flying object and is determined by a parameter to provide an updated reference data, and wherein the reference data reproduce an ambient noise in relation to the radome with reference to the updated reference data, and wherein the parameter is selected from one or more of roll angle, pitch angle, yaw angle, altitude, air speed and ground speed of the flying object.

6. A method for detecting radome damage, the method comprising:
   continuously registering external impacts on a radome by a sensor unit;
   providing flight data to a processing unit connected electrically to the sensor unit, wherein the flight data provided comprises one or more of altitude, position and speed;
   providing reference data to the processing unit;
   comparing the external impacts registered by the sensor unit with the reference data and the flight data; and
   determining by the processing unit, based on the comparison, whether damage to the radome has occurred due to one or more events associated with the external impacts.

7. The method according to claim 6, further comprising: classification of the one or more events associated with the external impacts by the processing unit based on the determination.

8. The method according to claim 6, wherein the reference data are at least one of expected values or envelope curves calculated from the expected values, wherein damage is detected if in the step of comparing the external impacts registered are outside of at least one of the envelope curves.

9. The method according to claim 6, further comprising:
   determining at least one envelope curve of the reference data for a determined period; and
   self-calibrating the reference data based on a reserve of the at least one envelope curve.

10. A computer program product stored on a non-transitory medium comprising executable instructions which, when executed by a processor unit of a computing device, configure the computing device to perform the method of claim 6.

* * * * *